United States Patent [19]

Decker

[11] Patent Number: 4,471,887
[45] Date of Patent: Sep. 18, 1984

[54] DISPENSING DEVICE

[75] Inventor: Herman W. Decker, Port Salerno, Fla.

[73] Assignee: Component Management Corp., Port Salerno, Fla.

[21] Appl. No.: 372,098

[22] Filed: Apr. 26, 1982

[51] Int. Cl.³ .............................................. B67D 5/60
[52] U.S. Cl. .................................. 222/135; 239/123; 239/414; 222/145; 222/148; 222/149
[58] Field of Search ............... 239/106, 112, 117, 118, 239/123, 414, 527, 528; 222/135, 145, 144.5, 222/148, 149, 496

[56] References Cited

U.S. PATENT DOCUMENTS

| | | | |
|---|---|---|---|
| 3,067,987 | 12/1962 | Ballou et al. | 222/145 |
| 3,508,711 | 4/1970 | Switall | 222/497 |
| 3,790,030 | 2/1974 | Ives | 222/135 |
| 3,837,575 | 9/1974 | Lehnert | 239/112 |
| 4,023,733 | 5/1977 | Sperry | 239/112 |
| 4,117,551 | 9/1978 | Brooks | 222/148 |
| 4,155,508 | 5/1978 | Fiorentini | 239/414 |
| 4,332,335 | 6/1982 | Fiorentini | 222/145 |

Primary Examiner—H. Grant Skaggs
Attorney, Agent, or Firm—Fraser, Barker, Purdue & Clemens

[57] ABSTRACT

A device for mixing and dispensing two or more reactive liquids into a homogeneous stream. The device includes a mixing chamber with two or more inlets for introducing separate liquid components into and an outlet for dispensing the mixed liquid components from the chamber. Separate passages connect each inlet to a separate source of liquid. Also, each passage includes an on-off valve disposed between the liquid source and the inlet and each passage also includes a pressure opening truncated cone pin check valve seated in close position in a truncated inlet to the mixing chamber.

1 Claim, 9 Drawing Figures

DISPENSING DEVICE

BACKGROUND OF THE INVENTION

This invention generally relates to a device for mixing and dispensing a mixture of fluids and, more particularly, to a method and device for mixing a plurality of reactive fluids into a homogeneous reactive mixture and dispensing the mixture as quickly as possible thereafter.

Conventionally, fluids flowing under pressure are mixed in and ejected from devices such as dispensing guns. In such guns, the fluids are separately introduced into a mixing chamber having an open outlet end, from spaced inlets opening into the chamber. A plunger, occupying the chamber exposes the inlets in a rearward position and permits fluids to flow into the chamber, mix, and be ejected from the outlet end. Movement of the plunger toward its forward position closes the inlets and purges the chamber by expelling any residual material therein. The purpose of the plunger is to purge the chamber of any quantities of residual material, as well as to open and close the inlets communicating with the chamber.

To date, manufacturers of dispensing guns have overlooked the crucial point of having the fluid system completely filled and under uniform fluid pressure before the inlets to the mixing chamber are opened. If one fluid component arrives at its inlet prior to the other fluid component arriving to its inlet, the first fluid component fills the mixing chamber and crosses over to the other unfilled inlet. One attempt to overcome this problem has been to open valves at the inlets at the same instant the plunger occupying the chamber is retracted therefrom. Other attempts have been made to open valves at the inlets simultaneously, however the inlets may or may not have both fluid components present at the same instant. It has been found that if one or the other of the fluid component's pressure is lost during a standby, the unfilled inlet is again exposed to a possible crossover of fluid from the other inlet. Also, it has been found in practice that reactive fluids tend to seep around the plunger in the closed position, mix, and react to impede subsequent operation of the dispensing gun.

SUMMARY OF THE INVENTION

The dispensing gun of the present invention overcomes the aforementioned problems by providing spring-biased, normally closed check valves at each of the reactive fluid inlets to the mixing chamber. The check valves are opened by the pressure of the reactive fluid components.

More particularly, the dispensing gun includes a mixing chamber having an open outlet end. The reactive fluids are separately introduced into the mixing chamber through spaced inlets. In one embodiment, a plunger reciprocal along the axis of the chamber occupies the chamber and exposes the inlets in a rearward position and expels any accumulation of reacted fluids from the chamber in a forward position. In another embodiment, air is employed to expel any accumulation of reacted fluids from the chamber.

A spring-biased, normally closed check valve is disposed at each fluid inlet opening into the mixing chamber. The check valves are adapted to be opened by the fluid pressure of the respective reactive fluid component. Further, each fluid passage supplying a reactive fluid component to the check valves is provided with an on-off valve adapted to be opened and closed in conjunction with the reciprocating movement of the plunger. Accordingly, each reactive fluid component will simultaneously arrive at the respective inlet to the mixing chamber, but is prevented from entering the mixing chamber until the respective check valve is caused to be opened. Therefore, if one reactive fluid component arrives at the mixing chamber prior to the other, it will be prevented from moving into the other inlet by the closed check valve.

BRIEF DESCRIPTION OF THE DRAWINGS

The above, as well as other objects of the invention, will become readily apparent to one skilled in the art from reading the following detailed description of the preferred embodiment of the invention when considered in light of the accompanying drawings in which.

DETAILED DESCRIPTION OF THE PREFERRED EMBODIMENTS

Figure 1:
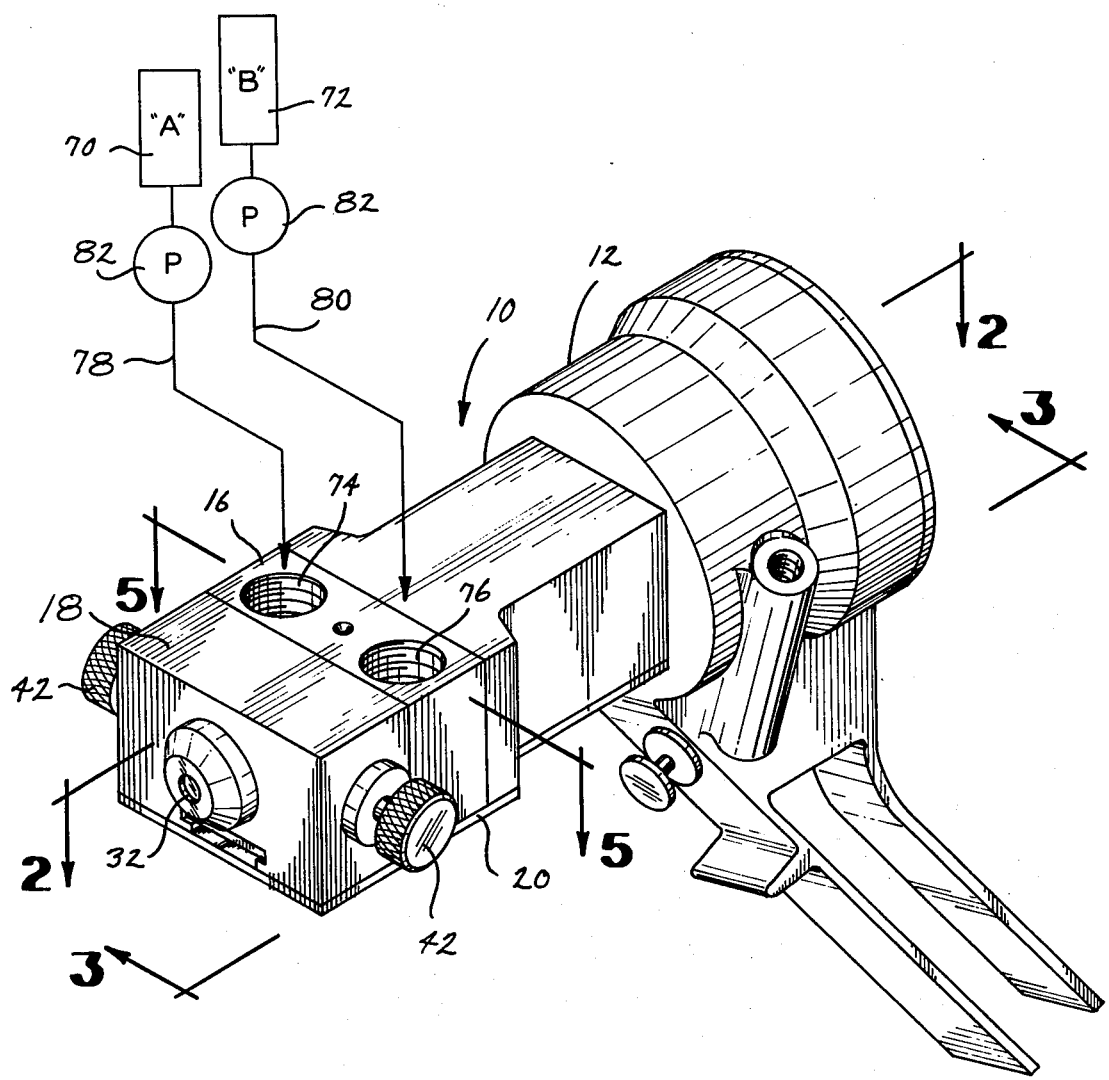
FIG. 1 is a perspective view of a dispensing device constructed in accordance with the invention together with a liquid supply circuitry shown in schematic form.

Referring now to the drawings wherein like reference numerals designate similar parts throughout, there is illustrated a dispensing device designated in its entirety by the reference numeral 10.

Figure 2:
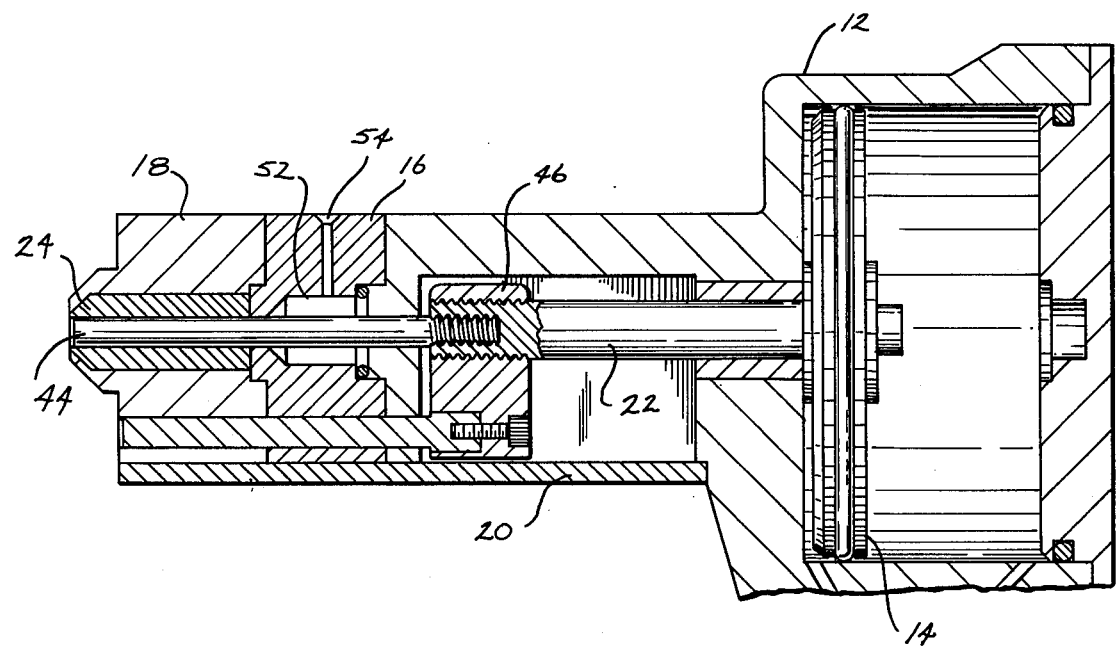
FIG. 2 is an enlarged cross-sectional view taken substantially along line 2—2 of FIG. 1.

The dispensing device 10 includes a main body 12 which houses a double acting piston 14 (FIG. 2) and supports a valve block 16 together with a dispensing block 18. A cover plate 20 attached to the bottom of the main body 12, the valve block 16 and the dispensing block 18 by conventional means (not shown) provides access to the interior components of the dispensing device 10.

Figure 3:
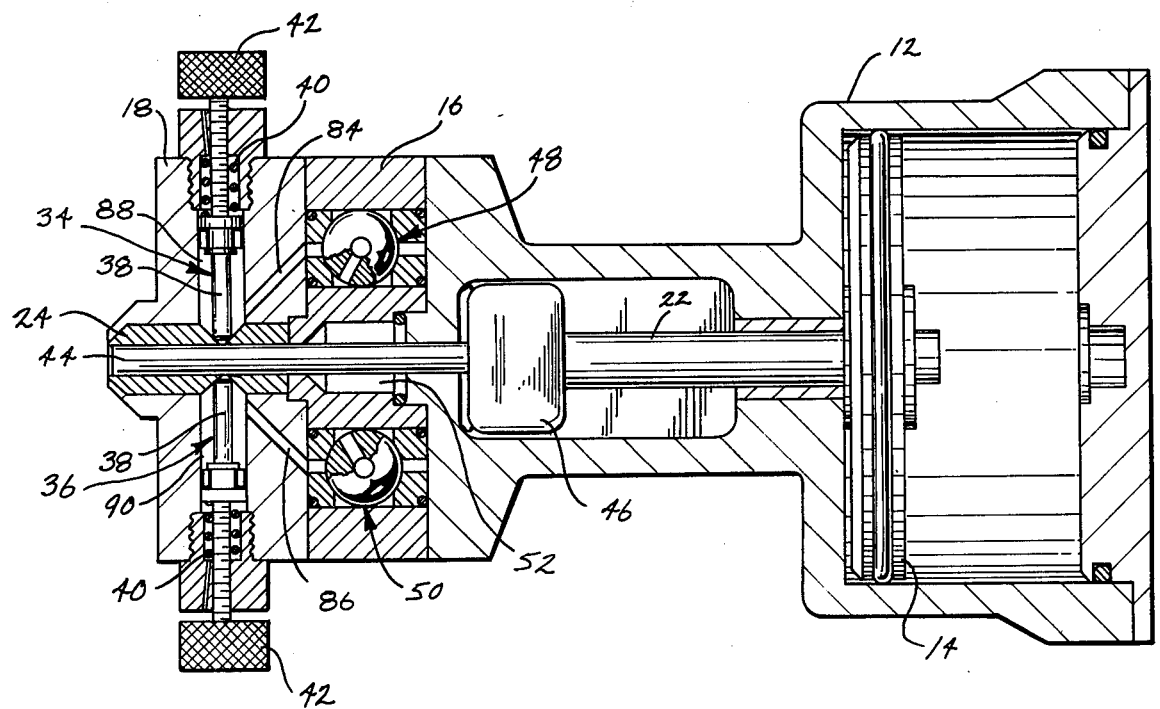
FIG. 3 is an enlarged cross-sectional view taken substantially along line 3—3 of FIG. 1 illustrating the dispensing device in the "off" mode.

The double acting piston 14 can be air operated to reciprocate an associated piston shaft 22 between a retracted position (FIG. 4) and an extended position (FIG. 3).

Figure 4:
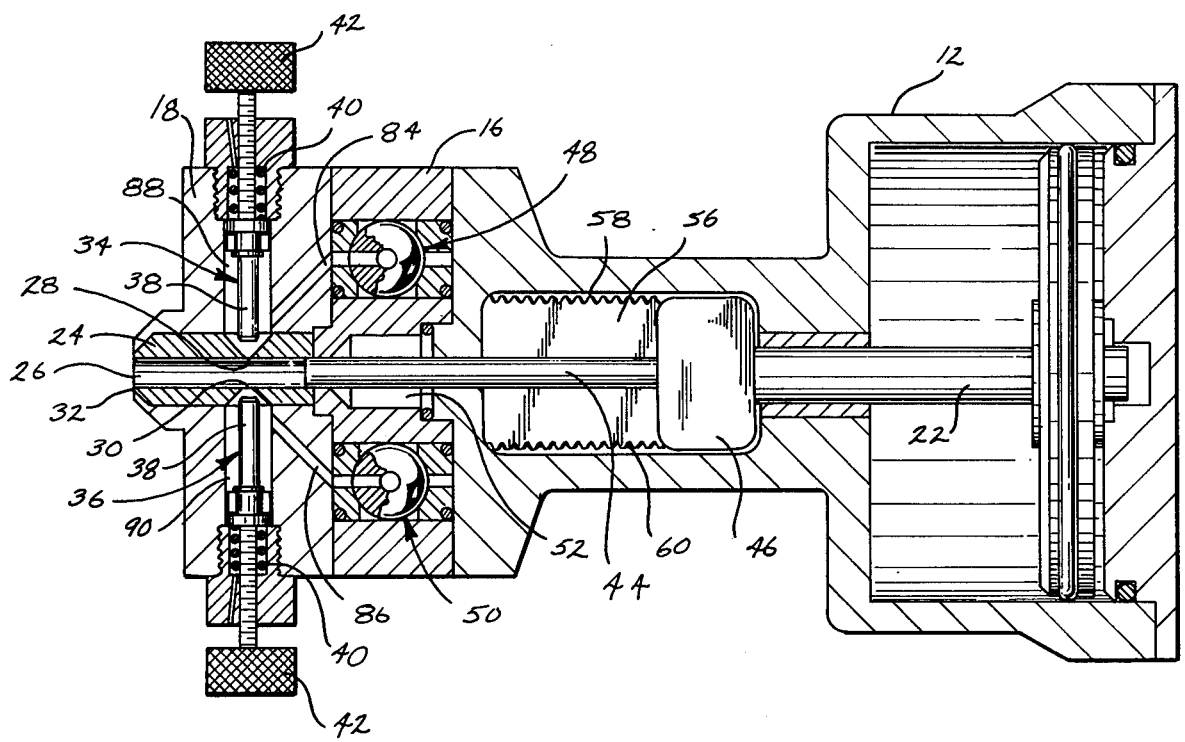
FIG. 4 is similar to FIG. 3 but showing the dispensing device in "dispensing" mode.

As best illustrated in FIGS. 3 and 4, the dispensing block 18 houses a cylindrical body 24 defining a mixing chamber 26 (FIG. 4) having a pair of inlets 28 and 30 and an outlet end 32 for dispensing a mixture of reactive fluid components A and B. A pair of normally closed identical check valves 34 and 36 encased in the dispensing block 18 communicate with the inlets 28 and 30, respectively, for concurrently introducing separate fluid components into the mixing chamber 26.

Figure 6:
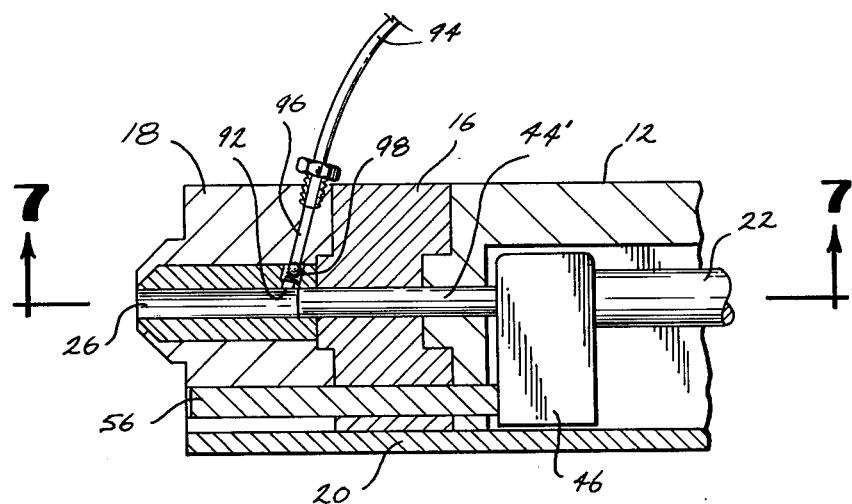
FIG. 6 is an enlarged fragmentary cross-section elevational view of another embodiment of a dispensing device constructed in accordance with the invention.

Each check valve 34 and 36 typically includes a plunger pin 38 normally biased into seating engagement with respective inlets 28 and 30 by a spring 40 for maintaining the inlets 28 and 30 closed in the absence of pressurized fluid. More specifically, as illustrated in FIGS. 3, 4, and 6, each inlet 28 and 30 is provided with a conical seat and the end of the plunge pin 38 includes a truncated cone having a truncated surface area which is only slightly larger than the mating conical seat of the inlets 28 and 30 for sealing the mixing chamber 26 from the passages introducing the separate fluid components. A stop screw 42 engaging the end of the plunger 38 may be adjusted to maintain the plunger 38 seated in the inlets 28 and 30 in the presence of pressurized fluid, or adjusted for controlling the instant of opening of the inlets.

A purge pin 44, connected to the end of the piston shaft 22 by means of an offset block 46, is reciprocated by the piston 14 between a retracted mixing position (FIG. 4), in which the inlets 28 and 30 are opened so that the reactive fluid components A and B can be introduced into the chamber 26, and in extended position (FIG. 3) in which the inlets 28 and 30 are closed to prevent the introductions of liquid components into the chamber 26. It should be noted that the plungers 38 will remain seated in the inlets 28 and 30 until fluid pressure overcomes the bias of the springs 40.

Still referring to FIGS. 3 and 4, the valve block 16 houses a pair of substantially identical on-off ball valves 48 and 50 which communicate with the inlet ports 28 and 30, respectively, for controlling the flow of each reactive fluid component A and B from its source to the dispensing device 10. Inasmuch as the ball valves are conventional, no further description thereof is deemed necessary.

A solvent reservoir 52 filled through a passage 54 and surrounding the purge pin 44, is typically provided in the valve block 16 for cleaning any accumulation of mixed reacted fluid components therefrom.

Figure 5:
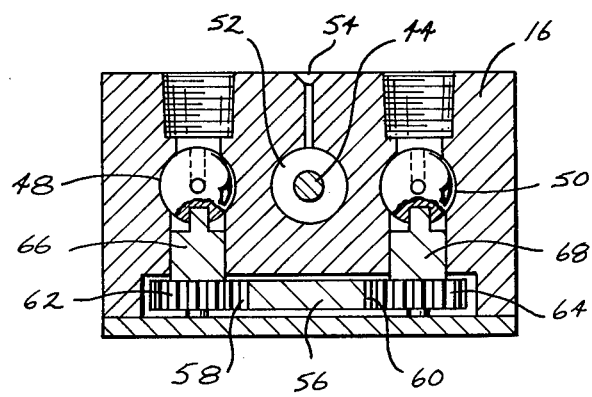
FIG. 5 is an enlarged cross-sectional view taken substantially along line 5—5 of FIG. 1.

Referring now to FIG. 5, the ball valves 48 and 50 are rotated between open and closed positions by a gear rack 56 having spaced teeth 58 and 60 slidably mounted in the valve block 16. More specifically, the rack teeth 58 and 60 engage pinion gears 62 and 64, respectively. The pinion gears 62 and 64 are fixedly attached to the bottom ends of upright posts 66 and 68, respectively. The opposite ends of the posts 66 and 68 are secured to the ball valves 48 and 50, respectively. The end of the rack 56 is attached to the offset block 46 in a conventional manner so as to be reciprocally moved by the piston 14.

The reactive fluid components A and B are introduced into the mixing chamber 26 from reservoirs 70 and 72, respectively. The reservoirs 70 and 72 are connected to the inlet port 74 and 76 provided in the valve block 16 by flexible conduits 78 and 80, respectively. Each line 78 and 80 contains a suitable pump 82 for pumping fluid components from the reservoirs to the respective inlet ports 74 and 76. The inlet ports the end cavity 88 and 90 containing the check valves 34 and 36 connect the inlet ports 74 and 76 to the mixing chamber inlets 28 and 30, respectively. In this system, a high pressure by-pass relief valve can be employed on each pump thereby enabling the two pumps 82 to be coupled to a common rocker arm and driven by a single motor (not shown) avoiding excessively high hose pressure during "stall out" when only one fluid hose to the gun is full of component material.

Referring now to FIG. 3, when the dispensing device 10 is in its "off" mode, the piston 14 is in its forward position, the purge pin 44 extends into and completely fills the mixing chamber 26; the ball valves 48 and 50 are closed effectively shutting off any flow to the feed passages 84 and 86. Also, the check valves 34 and 36 are in their closed positions on the seat closing the inlet ports 28 and 30 due to the lack of component fluid pressure.

Referring now to FIG. 4, the piston 14 is moved to the rearward position, thus retracting the purge pin 44 from the mixing chamber 26, opening the inlet ports 28 and 30 thereto. Concurrently, the ball valves 48 and 50 are rotated to an open position allowing pressurized, regulated fluid flow of the fluid components A and B to enter the cavities 88 and 90. The flow of pressurized fluid into the cavities thus moves the check valves 34 and 36 from their seat in the inlet openings 28 and 30.

In operation, initially a source of low pressure air is applied to the fluid pumping system. One of the check valves 34 or 36 is maintained in a closed position by adjusting the associated stop screw 42, allowing only one fluid component stream to enter the mixing chamber 26. The fluid component stream is permitted to flow until the stream is free of air bubbles. Then, the open check valve is allowed to close and the purge pin 44 to move forwardly, thus effectively purging the mixing chamber 26. The first open check valve is closed and the opposing check valve is opened and its fluid component only is allowed to enter the mixing chamber 26. When this liquid component stream is free of air bubbles, the device 10 is shut down allowing the open check valve to close and the purge pin 44 to move forwardly and effectively purge the mixing chamber 26. The check valves 34 and 36 are then set to open at the fluid pressure operating levels of the dispensing device 10.

Figure 7:
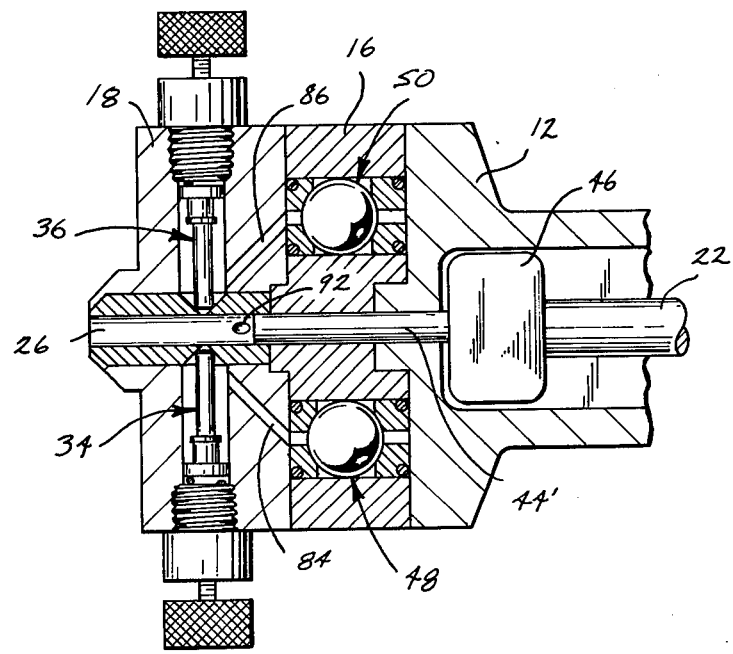
FIG. 7 is an enlarged fragmentary cross-sectional plan view taken substantially along line 7—7 of FIG. 6.

It should be understood that means other than the reciprocating pin 44 can be utilized to purge the mixing chamber 26. For example, air may be introduced into the rear portion of the mixing chamber 26 to purge the chamber of any quantities of residual materials. As illustrated in FIGS. 6 and 7, the rear portion of the mixing chamber 26 may be provided with a port 92 in communication with a source of pressurized air (not shown) through a conduit 94 connected to a passage 96 extending through the dispensing block 18 and body 24. A conventional check valve 98, located at the port 92 is operable to close the passage 96 to the ingress of mixed fluids from the chamber 26 and open the passage to direct a flow of purging air through the chamber. It should be noted that pin 44' serves as a guide and only extends through the valve block 16 in the forward position. In all other aspects, the structure and operation of the dispensing device 10 are the same as previously described for the other embodiments.

Figure 8:
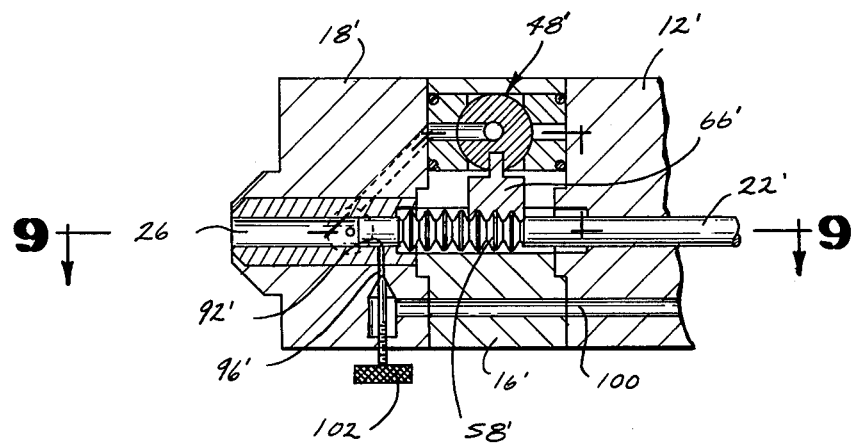
FIG. 8 is an enlarged fragmentary elevational view in section of a further embodiment of a dispensing device constructed in accordance with the invention.
Figure 9:
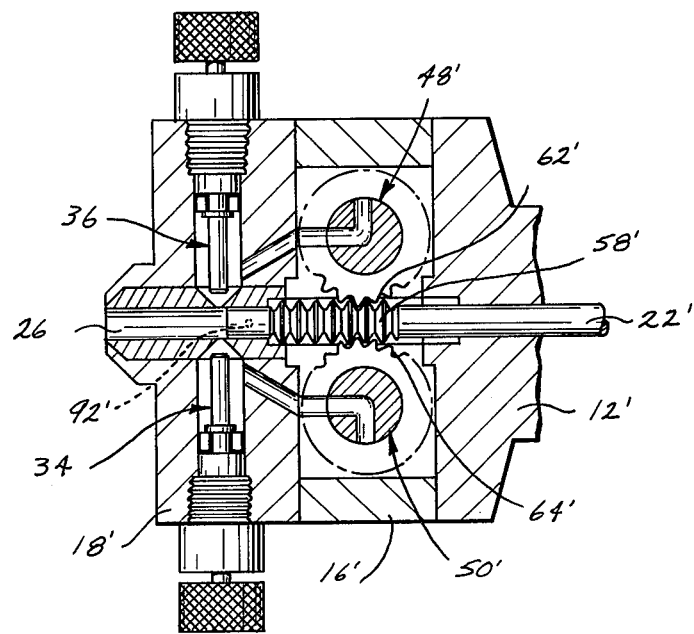
FIG. 9 is an enlarged fragmentary cross-sectional view of the embodiment shown in FIG. 8 taken substantially along line 9—9 thereof.

A further embodiment of the invention employing air to purge the mixing chamber 26 of any quantities of residual materials, is illustrated in FIGS. 8 and 9. As there shown, air is introduced into the rear of the chamber 26 through a port 92' in communication with a source of pressurized air (not shown) through a passage 96' extending through a dispensing block 18'. The passage 96' is in communication with the source of pressurized air through a passage 100 extending through a valve block 16' and the main body 12'. A needle valve 102, located at the juncture of the passages 96' and 100, is operable to adjust the rate of flow of the purging air entering the chamber 26.

In this embodiment of the invention, ball valves 48' and 50' are rotated between open and closed positions by providing a series of longitudinally spaced, circumferential teeth 58' on a piston shaft 22' extending from and integral with a reciprocal piston (not shown). More specifically, the rack teeth 58' engage and rotate pinion gears 62' and 64' (FIG. 9) fixedly secured to the ball valves 48' and 50', respectively. Each of the pinion gears 62' and 64' is fixedly attached to the bottom end of an upright post 66'. The opposite ends of the posts 66' are secured to the ball valves 48' and 50', respectively.

The end of the piston shaft 22' projects into the chamber 26 and is reciprocated between an extended mixing position, in which the port 92' is closed (FIGS. 8 and 9), and a retracted position in which the valves 48' and 50' are closed and port 92' is open to introduce purging air into the chamber 26. In all other aspects, the structure and operation of this embodiment of the dispensing device are substantially the same as previously described for the other embodiments.

In considering the foregoing disclosure, it will be obvious to one skilled in the art that the instant invention provides a fluid mixing and dispensing device which provides a fluid system to be completely filled and under uniform pressure before the inlets to the mixing chamber 26 are opened. Also, a fluid component first arriving at the mixing chamber is prevented from crossing over and entering the unfilling inlet to the chamber.

In accordance with the provisions of the patent statutes, the principles and mode of use of the invention has been explained and what is considered to represent its preferred embodiment has been illustrated and described. It should, however, be understood that the invention may be practiced otherwise than as specifically illustrated and described without departing from its spirit and scope.

What is claimed is:

1. A device for mixing and dispensing a plurality of reactive fluids comprising:
    a. a mixing chamber having at least two inlets and an outlet;
    b. a passage opening into each said inlet, each adapted to introduce a component fluid through said inlets into said mixing chamber from separate sources;
    c. first valve means disposed in each said passage for opening and closing said passage;
    d. second pressure activated valve means disposed downstream of said first valve means, said second pressure activated valve means including a seating portion disposed at said inlets and an activating portion disposed upstream of said seating portion for preventing flow of fluid from said mixing chamber into either said passage;
    e. means for introducing purging air into said mixing chamber; and
    f. a purge pin extending into said mixing chamber rearwardly of said inlets in a forward position for closing said purging air means when reactive fluids are being introduced into said mixing chamber and permitting purging air to be introduced into said mixing chamber when said purging pin is in a rearward position.

* * * * *